3,206,492
SULFOESTERIFICATION OF AROMATICS

Albin F. Turbak, New Providence, and Allen Noshay, Fords, N.J., assignors to Esso Research and Engineering Company, a corporation of Delaware
No Drawing. Filed Mar. 20, 1961, Ser. No. 96,679
6 Claims. (Cl. 260—456)

The present invention relates to the sulfoesterification of substances containing one or more aromatic rings and the products obtained thereby. More particularly it concerns the sulfoesterification of aromatic compounds by reacting them with complexes formed by combining compounds containing available sulfur trioxide with organic phosphorus compounds.

It is known that esters of toluene sulfonic acid can be synthesized by reacting chlorosulfonic acid with toluene and then reacting the sulfonyl chloride product with an alcohol in the presence of pyridine. This is an involved two step method that is commercially unattractive. It has now been found that the synthesis of aromatic sulfonic acid esters can be effected in a single step by reacting the aromatic compound with a phosphorus-containing complex.

In carrying out the present process, feeds containing aromatic substances, including substituted aromatics, are contacted with organic phosphorus compounds complexed with a substance containing available sulfur trioxide under conditions that favor the sulfoesterification of the aromatic component in the feed. The reaction is conveniently effected in the liquid phase at temperatures ranging up to the decomposition temperatures of the reactants or the products. For most purposes, temperatures up to about 150° C. are satisfactory. The temperature range recommended for most reactions is between 20° and 120° C., although subambient temperatures, e.g. 0° C., may be employed, if desired. The reaction pressure is not a critical condition, but for economic reasons it is best to use approximately atmospheric pressure. However, there is no intention to exclue the use of lower or higher pressures, i.e. 10 mm. to 300 p.s.i.a.

The ratio of the reactants charged initially to the reaction zone can be equimolar as illustrated by the following reaction which represents one of the reactions of the invention:

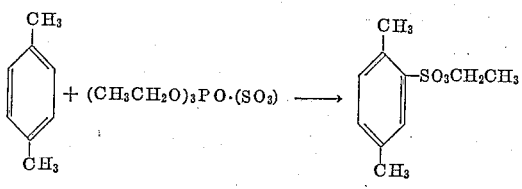

Of course, the molar ratio of aromatic reactant to complex is varied according to the reactivity of the aromatic compound and the number of reactive sites it possesses. For most purposes, molar ratios of about 0.2 to 2 are suitable. That is to say, the molar ratio of aromatic compound to phosphorus-containing compound in the complex falls within the aforementioned range.

With regard to the complex, it is advisable to employ a complex containing more than one mole of available sulfur trioxide per mole of phosphorus compound since this allows the utilization of lower reaction temperatures, i.e. approximately room temperature. Reactions such as that illustrated above usually require at least moderately high temperatures, e.g. 70° to 110° C., if commercially acceptable reaction times are to be realized. For instance, in processes in which the molar ratio of sulfur trioxide to phosphorus compound in the complex is approximately 1, the reaction may take 10 or more hours to reach substantial completion unless the reaction mixture is heated. On the other hand, the utilization of a complex containing more than one mole of available sulfur trioxide permits not only the use of lower temperatures, but also results in a shorter reaction period. Therefore in the preferred embodiment of the process, the phosphorus compound is complexed with 2 to 4 moles of available sulfur trioxide, e.g. sulfur trioxide itself.

Broadly speaking, the complex used in the process may be any organic phosphorus compound which is associated or complexed with a substance containing available sulfur trioxide. These complexes are disclosed in copending application Serial No. 803,355 (now U.S. Patent No. 3,072,703) of which Albin F. Turbak is the sole inventor. The present invention is the coinvention of Albin F. Turbak and Allen Noshay. The phosphorus compound should contain at least 1 ester oxygen and be either tri- or pentavalent. The organic portion comprises usually one or more alkyl moieties that optionally contain nonhydrocarbon substituents, such as halogens. The alkyl group, which can be normal or branched, generally contains 1 to 20 carbon atoms, and frequently has 1 to 5 carbon atoms. Many of the phosphorus compounds that can be employed to make the complex come within the purview of the following formulae:

and

wherein $R_1$, $R_2$ and $R_3$ are substituted, e.g. halogenated, hydrocarbon or $C_1$ to $C_{20}$ alkyl or alkoxy groups. The only requirement being that one of the "R" groups is an alkoxy radical, i.e. the monovalent radical RO—. The phosphorus compounds, as shown in the formulae, contain either a free electron pair or a phosphoryl oxygen.

The alkyl phosphorus esters that are most useful are the organo phosphates, especially the lower trialkyl phosphates, e.g. triethyl phosphate. Other organic phosphorus esters that can be used to prepare the complex are organo phosphites, phosphinates and phosphonates. Specific examples of compounds that may be used to form the sulfoesterifying agent are triethyl phosphate, trimethyl phosphate, tributyl phosphate, tridecyl phosphate, tripropyl phosphite, tributyl phosphite, tri(b-chloroethyl) phosphate, methyl diethyl phosphonate, dimethyl ethyl phosphinate and chloroethyl diethyl phosphonate.

The complex is formed by reacting about 1 to 4 moles of available sulfur trioxide with the selected organo phosphorus compound at ambient temperature and atmospheric pressure. For most purposes the maximum number of moles of available sulfur trioxide per mole of phosphorus compound is equal to 1 plus the number of ester oxygens in said compound. Larger amounts of the sulfur trioxide substance may be utilized but this is usually accompanied by side reactions, i.e. the formation of sulfonic acids. The complex-forming reaction can be carried out by simply mixing the two materials in the proper ratio in the presence of a halogenated paraffin solvent, such as dichloroethane. If a solvent is not used, cooling should be employed to prevent the temperature from rising too rapidly. For instance, the available sulfur trioxide may be added to a dilute (2–40 wt. percent) solution of the phosphorus compound. The solvent, when used, can be removed prior to effecting the sulfoalkylation reaction, if desired, but is generally not removed until after the aforementioned reaction has occurred.

By the term "available sulfur trioxide" is meant not only sulfur trioxide itself but also those substances which contain sulfur trioxide in a loosely bound form from which it can be readily liberated when treated with the phosphorus compound. Fuming sulphuric acid ("oleum," 20–80%) and chlorosulphonic acid are examples of products of the latter type which will form compounds with the phosphorus compound similar to that formed by sulfur trioxide but differing from that formed by ordinary sulphuric acid, and which act like sulfur trioxide-phosphorus complexes in sulfonation reactions. For the purposes of the present invention, compounds containing sulfur trioxide in loosely bound form may be considered equivalents of sulfur trioxide although the products may differ in some respect.

The aromatic reactant can be any substance having a completely unsaturated carbon ring, in other words, an aromatic-type nucleus, or substituted aromatic wherein the substituent has a Hammett Sigma constant between $-0.211$ and $+1.27$. If the substituent group contains active hydrogens, then excess sulfoesterifying agent must be used to compensate for these centers. Among the suitable aromatic reactants are naphthalene; cyclohexylbenzene; benzene; alkylated benzenes, such as toluene, xylenes, cumene, diisopropylbenzene; halogenated aromatics, such as chlorobenzene; nitrated aromatics, such as nitrobenzene; aromatic acids, and benzoic acid esters, such as benzoic acid and ethyl benzoate. In the case of the alkylated aromatics, the alkyl moiety can have 1 to 20 carbon atoms. Benzaldehyde and benzophenone are examples of carbonyl-containing aromatics which can be used in the process.

The sulfoesterification reaction may or may not be effected in the presence of an inert solvent. If a solvent is used it is preferred to employ chlorinated solvents, such as those used to make the complex reactant, e.g., such as carbon tetrachloride, chloroform, dichloroethane, methylene chloride, etc. Other halogenated solvents as well as liquid hydrocarbons can be used provided they are inert. The amount of solvent used is not important. Usually 1% to 50% (by weight) solutions of the reactants are used.

The reaction with the aromatic compound and the sulfoesterifying complex can be carried out to substantial completion in batch operations in up to 18 hours, depending on the composition of the complex. In continuous processes wherein the unreacted materials are recycled, substantially lower conversion levels can be tolerated and therefore the residence time can be much shorter, i.e. a few seconds to several minutes. In either type operation the reactants are contacted for a period of time sufficient to permit the reaction to attain the desired conversion level, i.e. at least about 10 or 20%.

The sulfoesterified aromatic product is recovered from the reaction mixture by conventional methods, such as adding it to water, separating the insoluble, oily material, washing the insoluble layer with additional water, neutralizing the oil layer with dilute alkali, separating the layers and drying the organic layer. The layer can then be distilled to recover pure product.

The sulfoesterified aromatics made by this process can be used to make aromatic sulfonic acids and ethers, such as diethyl ether or phenyl ethyl ether by reacting them with ethanol or phenol at elevated temperatures (50–60° C.). Isocyanates can also be made by reacting the esters with potassium cyanate. The esters can also be employed as pesticides. Because the ester products decompose to produce sulfonic acids on heating they are useful as catalysts where a controlled release of acidity at higher temperatures is desired, such as sulfonic acid catalyzed condensation reactions, e.g. acetone to mesityl oxide and the preparation of bis-phenols by the reaction of phenol with a carbonyl, i.e. acetone or formaldehyde.

The following examples are given to provide a better understanding of the invention.

EXAMPLE 1

To 73.2 grams (0.4 mole) of triethyl phosphate maintained at 15° C. was added dropwise 16.8 cc. (0.4 mole) of sulfur trioxide with stirring. To the complex so formed was added 48 grams (56 cc.) of distilled cumene and the resultant mixture was stirred and heated to 100°–105° C. for about 20 hours. The reaction mixture was then cooled to about room temperature and the liquid was added to 250 cc. of water. Thereafter the lower organic layer comprising 94 cc. was separated from the aqueous layer and washed with 100 cc. of water. Phenophthalein indicator was then added to the organic layer and it was neutralized with 65 cc. of 0.5 N sodium hydroxide. The lower layer was then dried over sodium sulfate and filtered to obtain 75 cc. of a clear yellow oil. The oil was distilled at under 0.3 mm. of Hg absolute pressure and two fractions were recovered, one boiling below 75° C. and the other between 75° and 125° C. These fractions were separately redistilled under 0.2 mm. pressure to produce narrow cuts:

|  | Boiling Range, ° C., under 0.2 mm. press. | Vol. cc. |
|---|---|---|
| Cut I | Up to 30 | 16 |
| Cut II | 32 to 50 | 32 |
| Cut III | 50 to 81 | 4 |
| Cut IV | 81 to 120 | 15 |

Cuts II and IV were redistilled and two pure products boiling at 44°–45° C. and 117°–118° C. under 0.2 mm. pressure were obtained. These were identified by elemental and infrared analyses to be diethyl sulfate and the ethyl ester of cumene sulfonic acid, respectively. The latter consisted mainly of the para isomer ($n_D^{20}=1.5065$).

EXAMPLE 2

The above example was repeated using 0.4 mole of p-xylene in lieu of cumene. A distillate (18 cc.) boiling at about 101° C.–105° C. under 0.2 mm. pressure was recovered and analyzed by its infrared spectrum to be the ethyl ester of p-xylene sulfonic acid, i.e. o-sulfoethyl-p-xylene ($n_D^{20}=1.5130$). It was analyzed as follows:

| Element | Found | Theoretical for $C_{10}H_{14}SO_3$ |
|---|---|---|
| C, percent | 55.74 | 56.0 |
| H, percent | 6.38 | 6.54 |
| S, percent | 14.46 | 14.92 |
| P, percent | 0.03 | 0 |

EXAMPLE 3

*Sulfoesterification of cumene at room temperature*

A. WITHOUT SOLVENT 38 ml. (0.9 mole) of $SO_3$ was slowly added to 54 g. (0.3 mole) of triethyl phosphate with cooling. To this homogeneous liquid was added 27 g. (0.225 mole) of cumene with stirring over a period of 5 minutes. The temperature of the reaction was not controlled externally. After another ten minutes' stirring, the reaction mixture was poured into excess distilled water. Heat was evolved and a heavy oil settled on the bottom. The oil was extracted with ether. The ether layer was dried over $Na_2SO_4$ and was stripped under vacuum. The resulting yellowish oil was distilled:

| Cuts | Temperature and Pressure | Weight, g. |
|---|---|---|
| I | 44° C. @ 0.1 mm | 3.5 |
| II | 55° C. @ 0.1 mm | 0.7 |
| III | 107.5° C. @ 0.1 mm | 3.8 |
| IV | 115° C. @ 0.15 mm | 0.8 |

Cut III (water white) had $n_D^{20}=1.5020$.
*Elemental analysis.*—Calculated for $$(CH_3)_2CHC_6H_5SO_3CH_2CH_3$$

C, 57.86; H, 7.07; S, 14.05; O, 21.03. Found: Percent C, 57.0; percent H, 7.2; percent S, 13.79; percent O, 19.78.
Cut I contained 8.89% P and therefore was probably partially triethyl phosphate.

B. WITH SOLVENT 42 ml. (1.0 mole) of $SO_3$ was added slowly to a stirred solution of 60 g. (0.33 mole) of triethyl phosphate in 100 ml. of 1,2-dichloroethane, with cooling. This resulting solution and a solution of 30 g. (0.25 mole) of cumene in 200 ml. of 1,2-dichloroethane were added simultaneously and with stirring to a reaction flask containing 100 ml. of 1,2-dichloroethane. The temperature of the reaction mixture, which was not controlled externally, rose from 25° C. to 50° C. during the ten minute addition period. Stirring was continued for an additional 15 minutes. The clear, yellowish reaction solution was poured into an excess of water. The resulting water insoluble, heavy oil was extracted with ether. The ether layer was dried over $Na_2SO_4$ and stripped. The residual oil was distilled:

| Cuts | Temperature and Pressure | Weight, g. |
|---|---|---|
| I | 44°–58° C. @ 0.1 mm | 14.5 |
| II | 107°–115° C. @ 0.15 mm | 20.6 |

Cut II had a saponification equivalent of $233\pm11$ (theoretical for ethyl ester of cumene sulfonic acid=228). The 3,5-dinitrobenzoate derivative of the alcohol portion of the ester (Cut II) was prepared. Its melting point was 91–2° C. (literature M.P. for 3,5-dinitrobenzoate of ethanol=93° C.) These data together with the elemental analyses prove that the product is the ethyl ester of cumene sulfonic acid.

EXAMPLE 4

To 36.6 g. of triethyl phosphate (0.2 mole) dissolved in 100 cc. of dichloroethane is added 16.6 cc. of $SO_3$ (0.4 mole) at 15° C. Then 21.2 g. (0.2 mole) of p-xylene dissolved in 50 cc. of dichloroethane is added at 25° C.$\pm 1°$ C. The reaction is continued for 30 minutes at 25° C. and then the reaction mixture is added to 500 cc. of ice water. The lower dichloroethane layer is separated and dried over anhydrous sodium sulfate. The excess dichloroethane is then stripped off and the heavy bottoms are fractionated at reduced pressure to give 14.2 g. of triethyl phosphate (B.P. 44–50° C. at 0.2 mm.) and 6.0 g. of the sulfoethyl ester of p-xylene (B.P. 105° C. at 0.2 mm.)

EXAMPLE 5

The procedure described in Example 4 is repeated except that 33.2 cc. of $SO_3$ (0.8 mole) is used. The yield consists of 10.0 g. of triethyl phosphate (B.P. 45° C. at 0.2 mm.) and 10.1 g. of sulfoethyl ester of p-xylene (B.P. 103–107° C. at 0.2 mm.).

EXAMPLE 6

Example 1 is repeated using chlorosulfonic acid instead of sulfur trioxide.

EXAMPLE 7

Example 1 is repeated using tributyl phosphate instead of triethyl phosphate.

EXAMPLE 8

Example 1 is repeated using triethyl phosphite instead of triethyl phosphate.

EXAMPLE 9

Example 3 is repeated using toluene. The product obtained is identical with ethyl p-toluene sulfonate.

EXAMPLE 10

Example 3 is repeated with benzene. The product is the ethyl ester of benzene sulfonic acid.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. A process for directly sulfoesterifying aromatic compounds which comprises contacting (1) an aromatic hydrocarbon compound selected from the group consisting of benzene and naphthalene and $C_1$ to $C_{20}$ alkyl substiauated derivatives thereof with (2) a composition of matter consisting essentially of a combination of (A) sulfur trioxide derived from a member selected from the group consisting of sulfur trioxide, chlorosulfonic acid and oleum with (B) an organo phosphorus ester containing at least one ester oxygen and selected from the group consisting of compounds having the following structural formulae:

and

in which $R_1$, $R_2$ and $R_3$ are selected from the group consisting of $C_1$ to $C_{20}$ acyclic unsubstituted and chlorosubstituted alkyl and alkoxy radicals with the proviso that at least one R radical is an alkoxy radical, said composition of matter constituting a sulfur trioxide-organo phosphorus ester complex containing 1 to 4 moles of sulfur trioxide per mole of organo phosphorus ester, at temperatures of from room temperature up to 150° C. to form the corresponding alkyl ester of the sulfonic acid of said mononuclear aromatic hydrocarbon, and recovering said ester.

2. A process according to claim 1 in which the aromatic compound is benzene.

3. A process according to claim 1 in which the aromatic compound is cumene.

4. A process according to claim 1 in which the aromatic compound is toluene.

5. A process for directly sulfoesterifying an alkylated benzene compound wherein the alkyl moieties have from 1 to 20 carbon atoms and said alkylated benzene compound is selected from the group constituting of alkylated benzene hydrocarbon compounds and substituted alkylated benzenes wherein the substituents do not interfere with sulfoesterification which comprises contacting (1) said alkylated benzene compound with (2) a composition of matter consisting essentially of a combination of (A) sulfur trioxide derived from a member selected from the group consisting of sulfur trioxide, chlorosulfonic acid and oleum with (B) an organic phosphorus compound containing at least one ester oxygen and selected from the group consisting of compounds having the following structural formulae:

and

in which $R_1$, $R_2$ and $R_3$ are selected from the group consisting of $C_1$ to $C_{20}$ acyclic unsubstituted and chloro-substituted alkyl and alkoxy radicals with the proviso that at least one R radical is an alkoxy radical, said composition of matter constituting a sulfur trioxide-organo phosphorus ester complex wherein the mole ratio of sulfur trioxide to organo phosphorus ester is approximately 1:1, at a reaction temperature ranging from room temperature to 150° C., and recovering the corresponding alkyl ester of the sulfonic acid of said alkylated benzene.

6. A process according to claim 5 in which said reaction temperature ranges from about 70° C. to about 150° C.

References Cited by the Examiner

UNITED STATES PATENTS

What is claimed is:

| | | | |
|---|---|---|---|
| 1,948,299 | 2/34 | Jahrstorfer et al. | 260—459 |
| 2,227,659 | 1/41 | Luther et al. | 260—459 |
| 2,486,417 | 11/49 | Jackson et al. | 260—456 |
| 2,613,195 | 10/52 | Craig | 260—456 XR |
| 2,851,508 | 9/58 | St. John et al. | 260—780 |
| 3,072,703 | 1/62 | Turbak | 260—461 |

OTHER REFERENCES

Berkman et al.: "Catalysis," page 210 (1940).

Hamilton et al.: Can. J. Chem., volume 37, pages 966–971 (1959).

Wiley et al.: J.A.C.S., volume 74, pages 6142–6144.

CHARLES B. PARKER, *Primary Examiner.*